(12) United States Patent
Martin et al.

(10) Patent No.: US 11,642,745 B2
(45) Date of Patent: May 9, 2023

(54) ROBOTIC SCREWDRIVER AND METHOD

(71) Applicant: ESTEG OÜ, Peetri (EE)

(72) Inventors: Vilist Martin, Peetri (EE); Vait Harti, Peetri (EE)

(73) Assignee: Optimo Robotics OÜ, Peetri (EE)

( * ) Notice: Subject to any disclaimer, the term of this patent is extended or adjusted under 35 U.S.C. 154(b) by 0 days.

(21) Appl. No.: 17/667,182

(22) Filed: Feb. 8, 2022

(65) Prior Publication Data
US 2022/0250197 A1  Aug. 11, 2022

(51) Int. Cl.
*B23P 19/06* (2006.01)
*B23P 19/00* (2006.01)
*B25J 15/00* (2006.01)

(52) U.S. Cl.
CPC ............. *B23P 19/06* (2013.01); *B23P 19/006* (2013.01); *B25J 15/0019* (2013.01)

(58) Field of Classification Search
CPC ..... B23P 19/06; B23P 19/006; B25J 15/0019; B25J 11/005; B25B 23/10
See application file for complete search history.

(56) References Cited

U.S. PATENT DOCUMENTS

| | | | | |
|---|---|---|---|---|
| 2,880,770 A * | 4/1959 | Ettinger | ............... | B25B 23/1456 81/429 |
| 3,333,613 A * | 8/1967 | Bosse | ................... | B25B 27/143 81/57.4 |
| 4,462,383 A | 7/1984 | Henke et al. | | |
| 5,365,810 A * | 11/1994 | Inaniwa | ................ | B23P 19/001 81/57.37 |
| 5,469,924 A * | 11/1995 | Kanamori | ............... | B25B 23/14 173/176 |
| 5,549,169 A * | 8/1996 | Matsumura | ............. | B23P 19/06 173/176 |
| 9,370,848 B2 * | 6/2016 | Harada | ................... | B23P 19/06 |
| 2013/0067711 A1 | 3/2013 | Harada | | |
| 2018/0021900 A1 * | 1/2018 | Huang | .................. | B23P 19/066 700/114 |

FOREIGN PATENT DOCUMENTS

JP  2017 109259 A  6/2017

OTHER PUBLICATIONS

European Search Report, EP App. 21155709.5, dated Aug. 5, 2021 (4 pages).

* cited by examiner

*Primary Examiner* — Ryan J. Walters
(74) *Attorney, Agent, or Firm* — Thomas | Horstemeyer, LLP

(57) ABSTRACT

The invention relates to attachments for industrial robotic equipment and in particular relates to screw driver attachments for standalone or collaborative robots. A screwdriver apparatus for a robotic arm is provided, the apparatus being suitable for installing screws of a known pitch into a component, the apparatus comprising a screw driving tool having a shaft rotatable about a central axis, the shaft having a distal end with a tip suitable for engaging with a screw, the shaft further having a proximal end connected to both a tool rotation apparatus and a tool linear movement apparatus, wherein the tool rotation apparatus and the tool linear movement apparatus are arranged to cooperate such that the tool tip is maintained at a constant pre-defined distance in relation to the screw when in use.

12 Claims, 9 Drawing Sheets

ROBOTIC SCREWDRIVER AND METHOD

CROSS-REFERENCE TO RELATED APPLICATION

This application claims priority benefit of EP Patent Application 21155709.5, filed Feb. 8, 2021, which is hereby incorporated herein by reference in its entirety.

BACKGROUND

Field of the Invention

The invention relates to attachments for industrial robotic equipment and in particular relates to screw driver attachments for standalone or collaborative robots.

Description of Related Art

Industrial robots are used for automated manufacturing processes. They are programmable and capable of movement in three or more axes. Typical applications of robots include welding, painting, assembly, disassembly, packaging, labelling and testing. They have high endurance, speed and precision. The most commonly used robot configurations are articulated robots in the form of robotic arms. The links of a robotic arm are connected by joints allowing either rotational motion (such as in an articulated robot) or translational (linear) displacement. The links of the arm form a kinematic chain and the terminus called the tool flange. Often a manufacturer produces a generic robot arm that is then customised for a particular application.

The assembly of complex and delicate products such as computers often use robotic arms in the production process because of the speed and accuracy achievable with a robot can surpass that of a human operative. A particularly useful robot arm attachment in this respect is a screwdriver for installing and tightening screws. The speed and accuracy of such devices is a limiting factor in the production line, so any improvement in the speed at which the screwdriver head can move to the next location has a direct effect on the production capacity of a manufacturer. However, in recent years, as products have become ultra-compact and lightweight, relatively soft materials such as aluminium and plastic have been used, which increases the need for accuracy in screw tightening, as any misalignment or over tightening can destroy the product being assembled. Conventional screw tightening devices such as that disclosed in JP2017109259 attempt to address this problem by employing a a feedback mechanism to detect the force on the screw and control a braking force applied to the device to make it larger than the weight of the tool. However, this still requires placing at least some force against the screw being installed, which still has the potential to damage the product being assembled.

It is therefore an object of the present invention to provide a stand-alone screw driver attachment for a robotic arm that does not damage the product being assembled.

SUMMARY OF THE INVENTION

In an embodiment, a screwdriver apparatus for a robotic arm is provided, the apparatus being suitable for installing screws of a known pitch into a component, the apparatus comprising; a screw driving tool having a shaft rotatable about a central axis, the shaft having a distal end with a tip suitable for engaging with a screw, the shaft further having a proximal end connected to both a tool rotation apparatus and a tool linear movement apparatus, wherein the tool rotation apparatus is arranged to rotate the tool about the central axis and the tool linear movement apparatus is arranged to move the tool along the central axis, the screwdriver attachment characterised in that the tool rotation apparatus and the tool linear movement apparatus are arranged to cooperate such that the tool tip is maintained at a constant pre-defined distance in relation to the screw when in use.

The pre-defined distance may be capable of being set such that there is a gap between the tool tip and the screw so that, in use, zero force is applied along the central axis as the screw is installed.

The pre-defined distance may be capable of being set such that, in use, the tool tip presses against the screw. The distance of the tool tip from the screw determines the force applied to the screw, such that if the distance is set to below the screw head, a force will be applied. The distance below the screw head determines the amount of force applied to the screw in the axial direction.

The tool rotation apparatus may comprise a tool rotation motor connected to the tool and a tool rotation motor controller for controlling the tool rotation motor.

The tool linear movement apparatus may comprise a tool linear movement motor and a tool linear movement motor controller. The tool linear movement motor controller is for controlling the tool linear movement motor.

The tool linear movement motor may be connected to a lead screw that is parallel to the central axis, the lead screw having a known pitch, wherein the tool is linked to a nut, which may be a ball nut, mounted on the lead screw, such that rotation of the lead screw causes the tool to move along the central axis.

The tool rotation apparatus may be connected to the ball nut, so that the whole of the tool rotation apparatus moves in an axial direction as the tool linear movement motor rotates the lead screw.

A memory unit may be provided, arranged to store user definable parameters relating to the screw type being installed, including the screw pitch, and parameters relating to the tool linear movement apparatus including the pitch of the lead screw, screwing speed and torque.

A processor may be arranged to send tool rotation signals to the tool rotation motor controller to rotate the tool and to send tool linear movement signals to the tool linear movement motor controller, wherein the processor may be arranged to calculate the tool linear movement signals based on the tool rotation signals and the ratio of the screw pitch to the lead screw pitch.

The motor of the tool rotation apparatus and tool linear movement apparatus may be servo motors having encoders, and wherein the memory unit may be further arranged to store data relating to the number of encoder steps in a full turn of the lead screw and the number of encoder steps required to move the tool a known distance along the central axis.

The memory unit may be arranged to store a user defined screwing speed at which the screw is installed and wherein the processor may be arranged to control the tool linear movement motor speed based on the screwing speed and the ratio of the screw pitch to the lead screw pitch.

The memory unit may be arranged to store a user defined screw length and the processor may be arranged to calculate the number of rotations of the tool rotation motor required to install the screw based on the screw pitch.

The processor may be arranged to calculate the screwing time based on the screwing speed and the screw length.

A screw gripper may be provided for gripping the screw to be installed prior to installation, the screw gripper comprising a set of jaws that include an internal shelf upon which the head of the screw rests. The distance between the tool tip and the screw may be measured in relation to the screw gripper because the screw to be installed is held in a known position by the screw gripper.

The screw gripper may be spring loaded and arranged to release the screw when the tool presses down on the screw.

In an embodiment, a robotic screwdriver system is provided comprising a screwdriver attachment as described above, wherein the screwdriver attachment is controlled by a screwdriver controller, the system further comprising a robotic arm and a robotic arm controller, wherein the robotic arm controller includes a user interface for a user to input instructions to control the system.

In an embodiment, a computer program product is provided capable of being installed in a robotic arm controller and in use capable of controlling the robotic screwdriver system of claim 20.

A screw housing tube may be provided for receiving a screw from a screw feeder apparatus and wherein the tool may be arranged to move within the screw housing tube and wherein the screw gripper may be mounted on the end of the screw housing tube.

A sensor may be provided to determine that a screw has arrived from the screw feeder apparatus.

The housing tube and screw gripper may be removable and can be replaced with a different sized arrangement to allow different sized screws to be installed.

The tool tip may be arranged to engage with cross head, flat, internal hex or external hex type screws or any type of screw.

In a further embodiment, a method of operating a screwdriver apparatus is provided comprising the steps of:

controlling a tool rotation motor to rotate a screw, controlling a tool linear movement motor to maintain the tool at a pre-determined distance from the screw as the screw is rotated to control the force applied to the screw as it is installed.

The method may further comprise the step of storing values representing the pitch of the screw to be installed and the pitch of the lead screw and controlling the tool linear movement motor in dependence on the ratio of the pitch of the screw to the pitch of the lead screw.

The method may further comprise the step of storing values representing the screwing speed for the screw and controlling the linear movement motor in dependence on the screwing speed and the ratio of the pitch of the screw to the pitch of the lead screw.

The method may further comprise the step of storing a value representing the length of the screw to be installed and controlling the number of turns applied by the tool rotation motor to the screw in dependence on the length of the screw.

DETAILED DESCRIPTION OF THE PREFERRED EMBODIMENT

The screwdriver attachment in accordance with an embodiment of the invention allows for highly accurate and rapid installation of screws without applying any force in an axial direction into the screw itself. It is also possible to apply a controlled force to the screw as it is installed. This, in combination with the use of fast and accurate servomotors allows the rapid assembly of delicate parts and also a safety feature that allows a use to work closely with the attachment.

Figure 1:
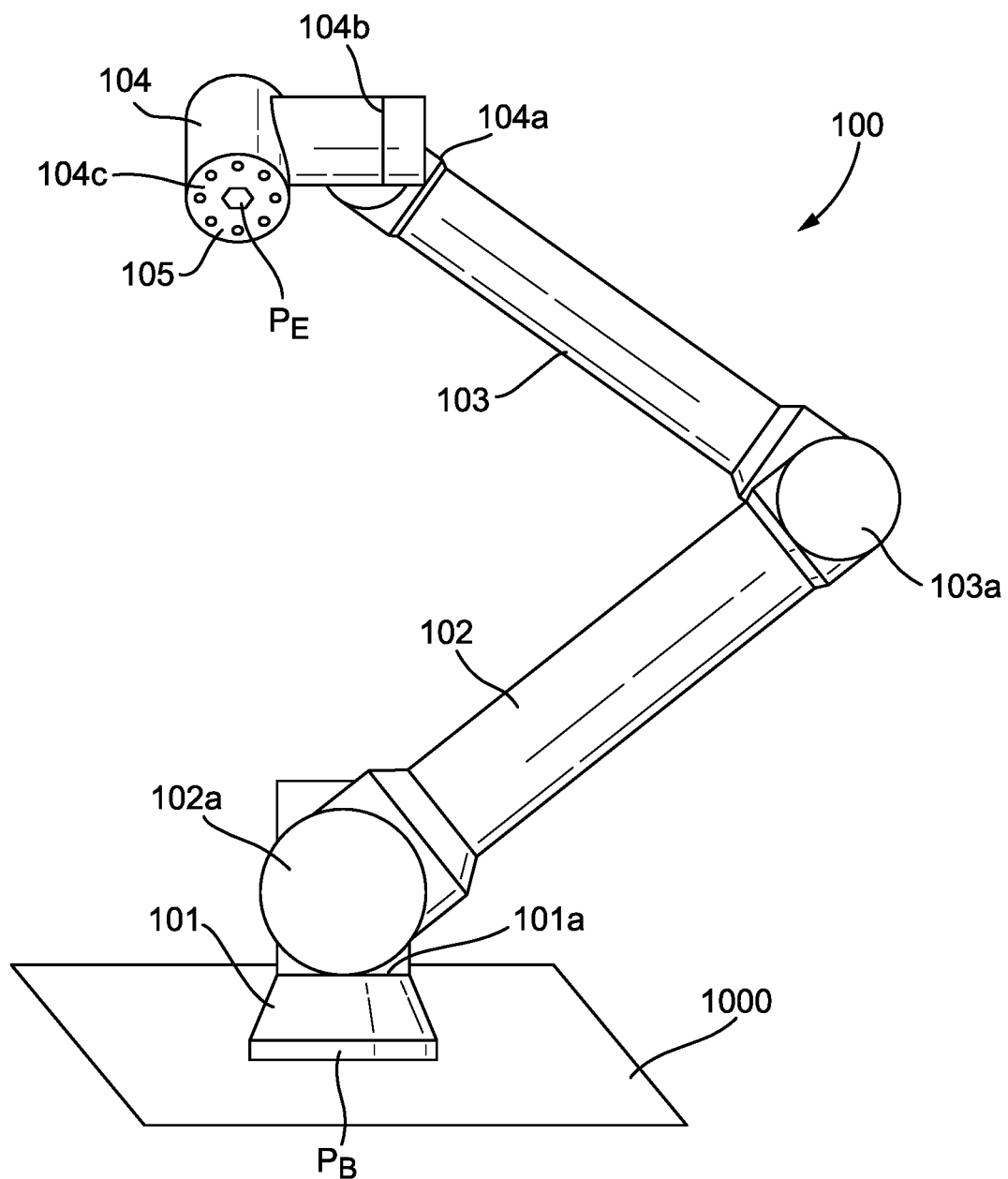
FIG. 1 is a representation of a generic robotic arm.

A typical robotic arm is shown in FIG. 1. The arm 100 has a base 101 for mounting the arm on a surface 1000. The base 101 has a base joint 101 which allows for rotational movement between the base and a shoulder joint 102a. The shoulder joint 102a is joined to a first link 102. A second link 103 is rotationally connected to the other end of the first link 102 by an elbow joint 103a. At the other end of the second link 103 is a wrist 104 having a first joint 104a, second joint 104b and third joint 104b. A tool flange 105 is connected to the wrist. The tool flange has six degrees of movement because of the joints. Sometimes the tool flange is known as the $6^{th}$ axis of the robotic arm. The tool flange 105 is a mechanical interface to which further equipment can be attached. Internal servomotors within the joints create controlled movement of the robotic arm and allow the tool flange 105 to move to any point in space around the robot arm within its range. The robotic arm is operated by control software running on hardware. When the robot arm is installed, the position of a central point on its base $P_B$ is recorded as a set of 6 values; the 3 dimensional coordinates, (x, y, z) plus 3 values that determine the orientation of the plane of the base; pitch, yaw and roll. The robot arm could be mounted on a wall or other non-horizontal surface. $P_B$ is a reference point against which all other positions are taken. The servo motors which control the arm have encoders which output an absolute value so the exact coordinates $P_E$ of the tool flange are always known. The hardware may be integrated into the arm or an external computer may be attached to run the software.

Figure 2:
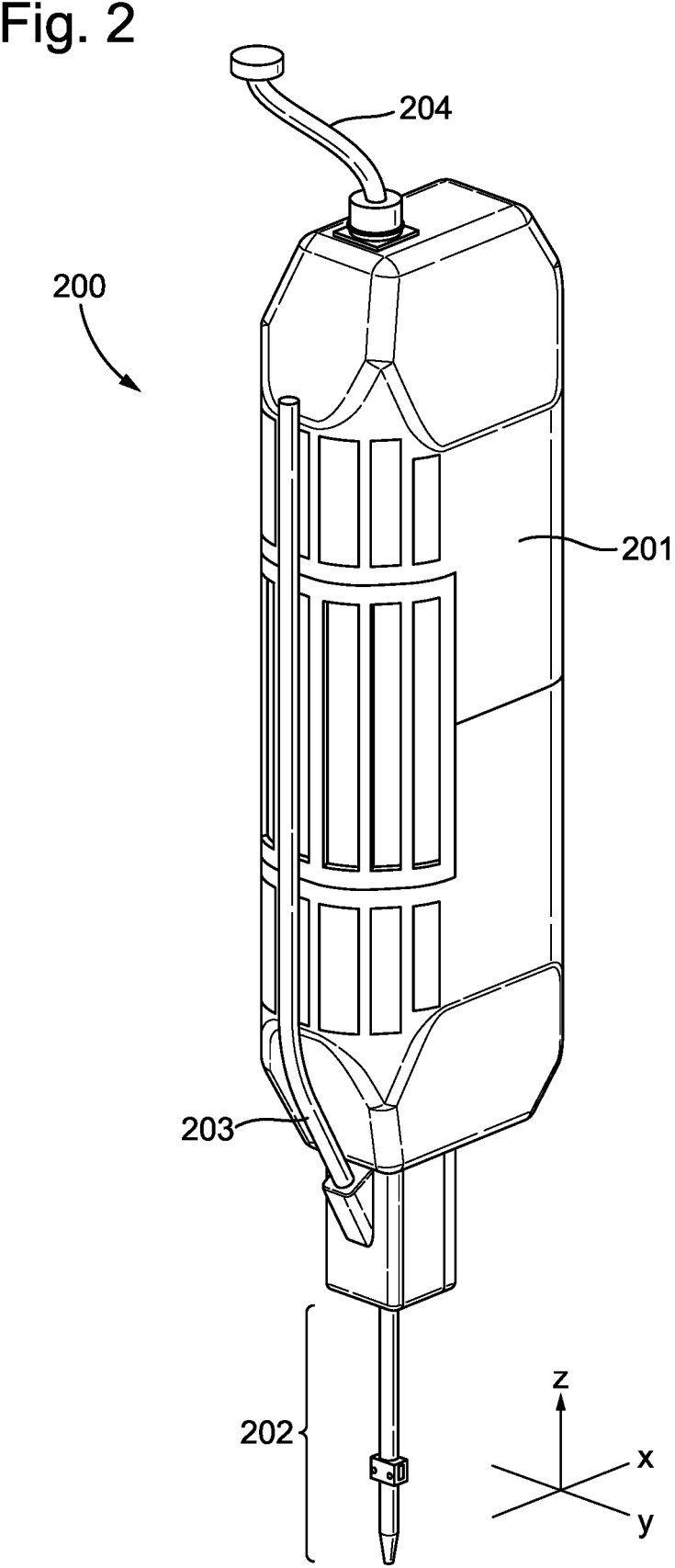
FIG. 2 represents a screwdriver attachment for a robotic arm in accordance with an embodiment of the invention.

FIG. 2 shows an embodiment of a screwdriver attachment 200 for a robotic arm. The screwdriver attachment 200 comprises a body section that contains control motors and other control hardware inside a housing 201. The screwdriver attachment 200 has a lower tool section 202 that is arranged to manipulate and install screws. A feed tube 203 is provided that can be connected to a suitable screw-feed system, such as a pneumatic system fed with air. Screw-feed systems are known in the art. A cable 204 provides a link to a screwdriver programming and control interface. The x and y coordinates define a plane while the z-direction is perpendicular to the x/y plane. The tool section is aligned with the z-direction.

Conventional screwdriver attachments rely on feedback from the servomotors of the robotic arm to establish how much force is being applied in the z-direction. This means that the screwdriver and the robotic arm must be able to communicate with each other, which increases the complexity of integrating these two units, as a user would need to know a deep level of programming for both systems. The problem is compounded because often, different manufacturers produce the screwdriver attachment and the robotic arm.

In the present invention, this problem is overcome by giving all of the z-direction force responsibility to the screwdriver attachment 200. The responsibility for positioning the tool in the correct place belongs to the robotic arm 100.

Figure 3:
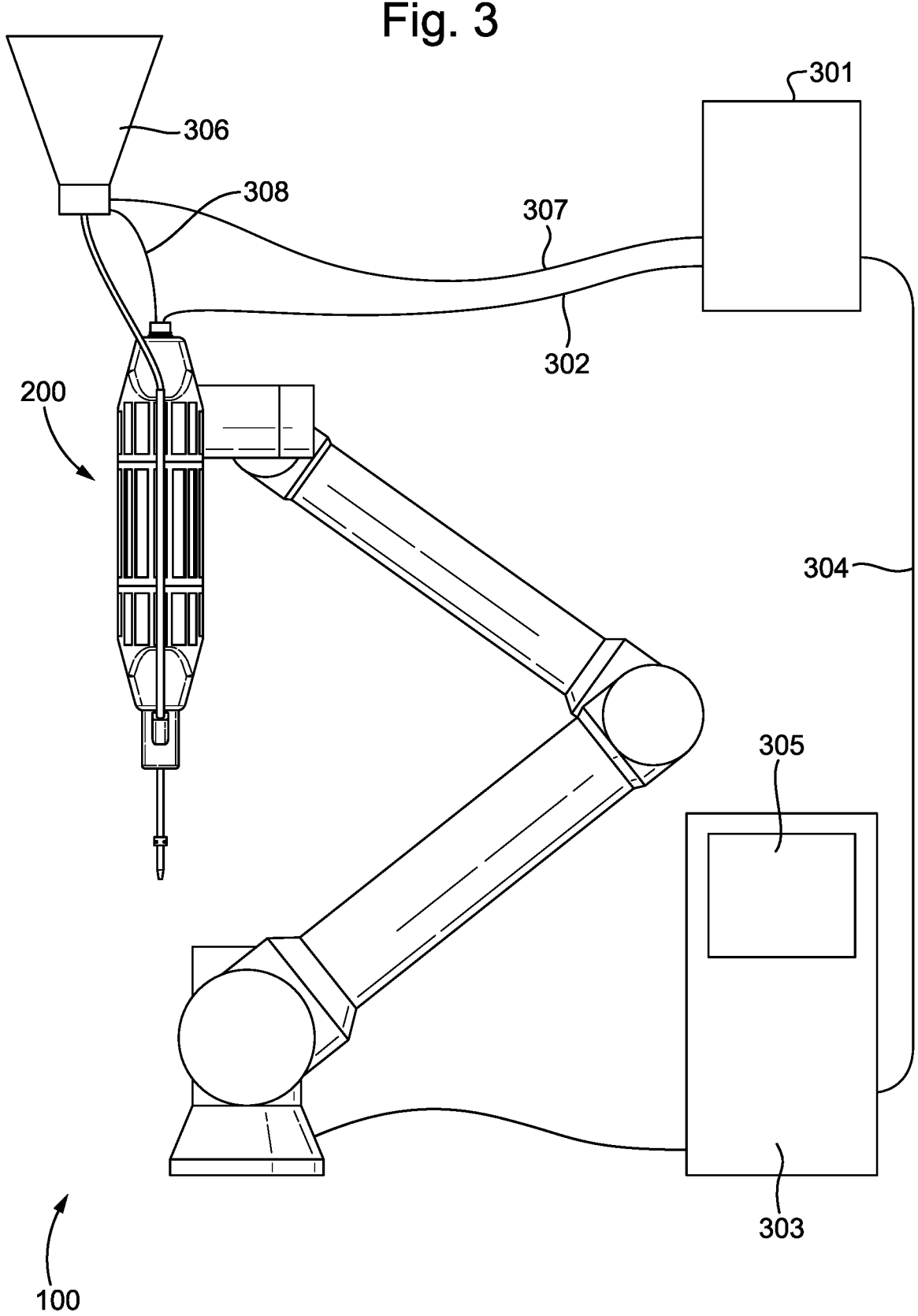
FIG. 3 is a representation of the screwdriver attachment of FIG. 2 on a robotic arm of the type shown in FIG. 1.

FIG. 3 shows an embodiment of the robotic screwdriver attachment 200 installed on a robotic arm 100. The screwdriver 200 is attached to the tool flange 105 of the robotic arm 100. The screwdriver 200 is electronically connected to a screwdriver controller 301 by cable 302. A robot arm controller 303 is connected by a LAN cable 304. The robot arm controller 303 has a user interface 305. A standard pneumatic screw feeder 306 is provided to feed screws to the screwdriver 200. The screwdriver controller 301 controls the screw feeder 306 and they are connected to each other by cable 307. The screwdriver 200 has a sensor that can sense when a screw has arrived; the feeder 306 can be instructed to resend a screw if one doesn't arrive for any reason, or an alarm signal send to the screwdriver controller if repeated attempts to send a screw fail. Communication between the feeder 306 and the screwdriver 200 is via cable 308.

Figure 4A:
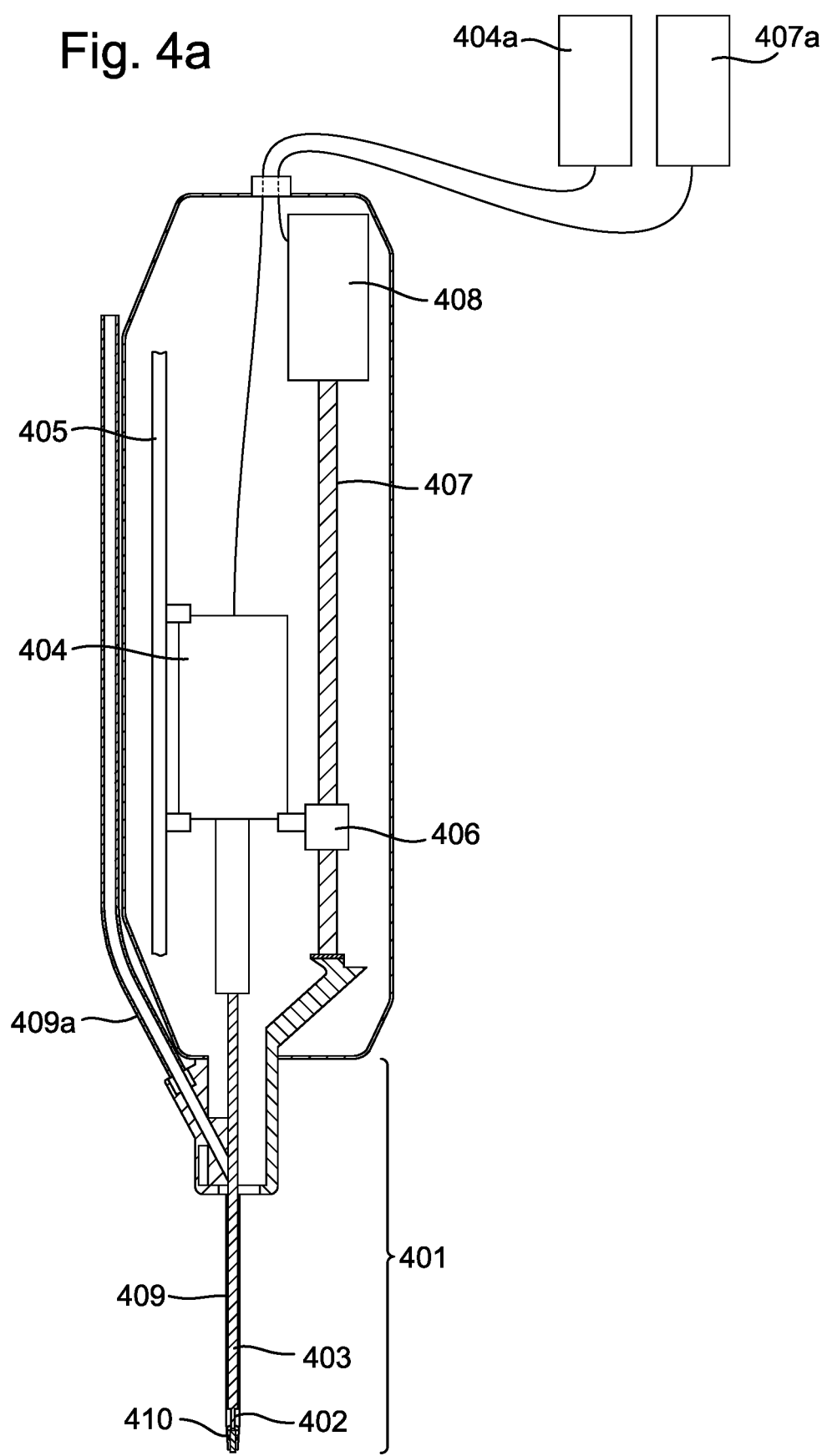
FIG. 4a is a cross sectional diagram of the embodiment of the screwdriver attachment of FIG. 2.

FIG. 4a shows the components of an embodiment of the robotic screwdriver attachment. The components are located inside the housing 201. A tool 401 is provided, comprising a tool tip 402 and a shaft 403. The tool tip 401 has flat faces and a hexagonal cross-section and is arranged to engage with the head of a screw to be inserted. The shaft 403 has an axis about which it rotates and this axis defines the z-direction. The shaft 403 is connected to a tool motor 404. In this embodiment, the tool motor is a servomotor with an output torque of between 0-3.6 Nm, rotation speed of 5000 RPM and an encoder resolution of 131,072 pulses per revolution, or more. The tool motor 404 is fixed into a housing that is arranged to be movable up and down along a rail 405. The servomotor is connected to an external amplifier 404A that can control the position, speed and torque of the tool motor 404. The tool motor 404 has a rotary encoder that outputs the absolute angular position of the motor axle from which the position of the tool tip 402 can be determined.

The tool motor housing has a bracket supporting an internally threaded nut 406 that engages with an externally threaded shaft 407, such that rotation of the threaded shaft 407 causes the tool motor to move vertically along the rail 405 in the z-direction. The threaded shaft 407 is a ball screw with a 10 mm pitch; other pitches could be used, for example 6 mm, 8 mm, 12 mm, 14 mm etc. This high helix, steep thread screw and nut arrangement allows for quick adjustment of small loads because a single turn causes the nut to travel a relatively long distance along the thread.

The threaded shaft 407 is connected to a z-direction motor 408. The z-direction motor 408 is a servomotor similar to the tool motor 404 but has torque in the range 0.2-0.4 Nm is required. The combination of a high performance servo motor, i.e. high speed and high accuracy, with a high pitch lead screw allows the position of the tool to be moved over large distances quickly but with very high accuracy. The z-direction motor 408 has a rotary encoder that outputs the absolute angular position of the motor axle and hence the angular position of the threaded shaft 407. The encoder is also enabled to count the absolute number of turns of the axle, so that the position of the nut 406 on the shaft is always known and correspondingly the position of the tool tip 402 in the z-direction, $Z_T$, is always known. For the type of z-direction motor specified above, its encoder has a resolution of 131,072 pulses per revolution. The threaded shaft has a pitch of 10 mm per turn, therefore the position of the tool tip can be controlled and measured to an accuracy of around +/−0.05 mm. The z-direction motor has a speed of 5000 RPM. The threaded shaft is 290 mm in length, therefore it would take 50 turns for the nut 406 to travel from one end of the lead screw to the other. Therefore the tool tip can be raised from its lowest position to its highest position in just under 1 second.

The tool 401 is movable inside a screw housing tube 409 that extends below the main housing 201. The length of the tool housing tube 409 is selected in relation to the accessibility required for the tool 401. A screw feed tube 409a is provided towards the top of the tool housing tube 408. The tool tip 402 is retractable by operating the z-direction servomotor 408 to above the entrance of the screw feed tube so that a screw may enter the tool housing tube 409 The end of the tool housing tube 409 has a screw gripper 410 which is a set of jaws to prevent a screw that enters the screw housing tube 409 from dropping out of the end before it is installed.

Figure 4B:
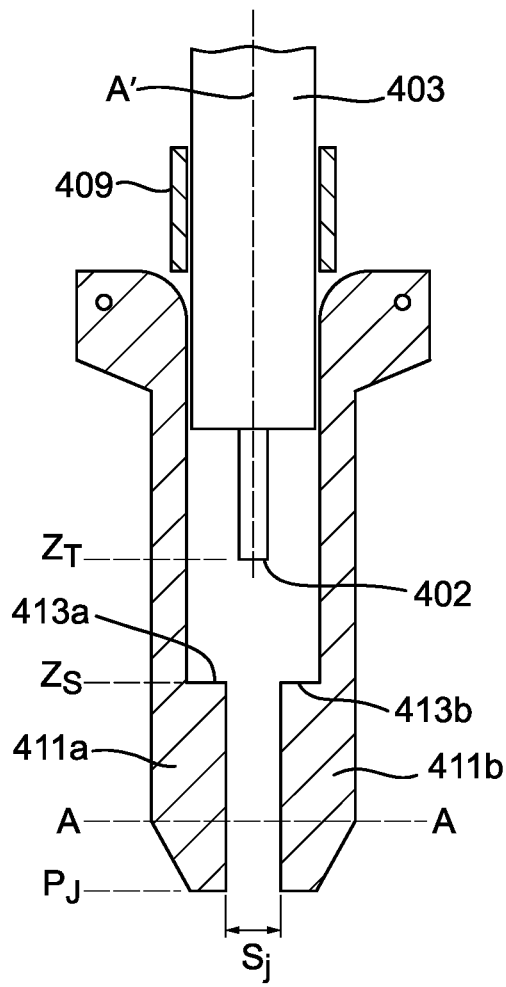
FIG. 4b is a cross sectional diagram of the jaws of the screwdriver attachment of the embodiment of FIG. 2.

The jaw arrangement is shown in more detail in FIG. 4b, which is a vertical cross-sectional view of the jaws. The housing tube terminates in a hinge portion that supports two jaws, 411a, 411b. The end profile of each jaw is semicircular with a semi-circular aperture, so that when the jaws are closed, they together form a circular opening 412 as shown in FIG. 4c through which the end of a screw can protrude. FIG. 4c shows a bottom view of the screw gripper taken along the line AA in FIG. 4d where the circular opening 412 can be seen. A cross-section of the jaws in a closed position is shown in FIG. 4b, with a space between the jaws $S_j$ large enough to accommodate the thread diameter of a screw to be installed. Each jaw has an internal lip 413a, 413b that provides a screw head shelf upon which the head of the screw to be installed can rest, prior to installation. The jaws of the screw gripper 410 are spring loaded and are opened by pushing down on the screw. The position of the end of the jaws of the screw gripper, $P_J$, is a 3 dimensional coordinate and is always fixed in relation to the position of the tool flange $P_T$. The position of the jaws, $P_J$, provides a reference point from which all other positions in the screwdriver are measured. This point is fixed with reference to the screwdriver itself because it is fixed to the housing. The point moves relative to the robotic arm and therefore the robotic arm determines the position of this point. The robotic arm is programmed to move this point to the required screw installation position.

The vertical z-axis position $Z_S$ of the screw head shelves 413a, 413b is known in relation to $P_J$. $Z_S$ is a fixed reference point. The z-axis position of the tool tip 402, $Z_T$ is known from information provided by the encoder of the z-axis motor 408 and this is variable.

Figure 4D:
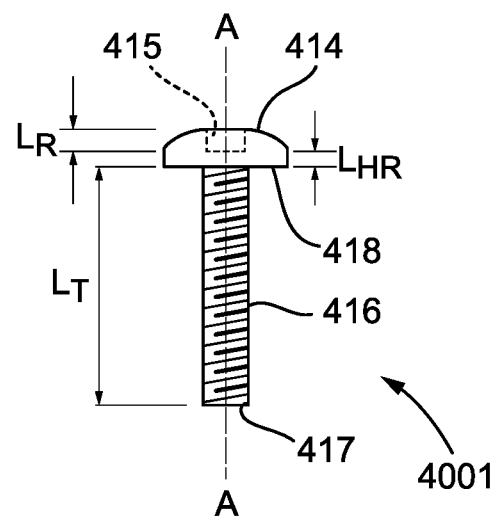
FIG. 4d is side view of a typical screw for use in an embodiment of the invention.
Figure 4C:
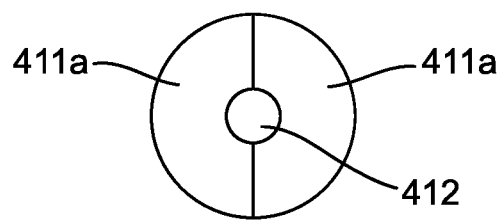
FIG. 4c is bottom view of the screw gripper of the screwdriver attachment of the embodiment of FIG. 2.
Figure 4E:
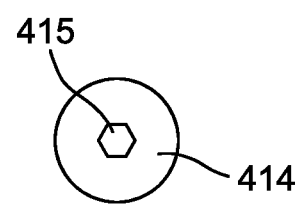
FIG. 4e is a top view of the screw shown in FIG. 4d.

FIG. 4d shows in more detail a side view of a screw 4001 to be installed. The screw 4001 has a head 414 with a hexagonal recess 415 for receiving the hexagonal-faced tool tip 402. A top-view of the screw head 414 is shown in FIG. 4e. The screw has a thread 416, with a known pitch $P_S$. The thread 416 has a known length, $L_T$, between a screw thread tip 417 and the underside 418 of the head 414. The thread is orientated along an axis AA. The axis A' of the tool shaft 403, when engaged with the screw, aligns with this axis AA. This axis defines the z-direction. The screw head recess 415 has a known depth, $L_R$, and the bottom of the recess is a known distance, $L_{HR}$, from the underside of the head of the screw. Accurate knowledge of the dimensions of the screw are important for the invention to function because the distance between the tool tip and the screw is carefully maintained during installation of the screw 4001. The characteristics of each screw to be installed are recorded. The characteristics recorded include:

Screw pitch, $P_S$
Thread length, $L_T$
Recess position, $L_{HR}$

The length of the thread of the screw $L_T$ is used to calculate the absolute position of the end of the screw, $P_{ES}$, which protrudes a short way past the end of the jaws. This protrusion provides a starting length for the screw to engage with a component into which the screw is to be installed.

Figure 4F:
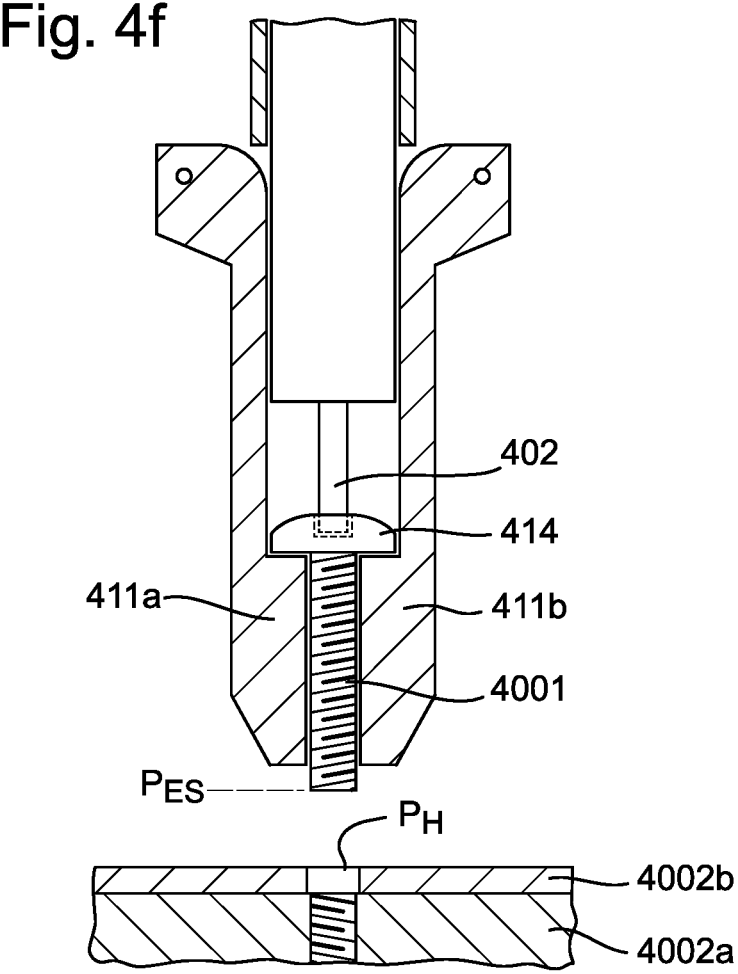
FIG. 4f is a cross sectional view of the jaws of an embodiment with a screw in place.

FIG. 4f shows the jaw arrangement with a screw 4001 in place and with the tool tip 402 engaged, ready for joining together two components 4002a, 4002b. The components have a pre-drilled and threaded hole located at a known position $P_H$ relative to the position of the base $P_B$ of the robot arm. The position of the end of the screw $P_{ES}$ is calculated from the position of the jaws $P_J$ the length of the thread $L_T$ and the position of the end effector $P_E$ of the robotic arm relative to its base position $P_B$ as shown in FIG. 1.

Figure 4G:
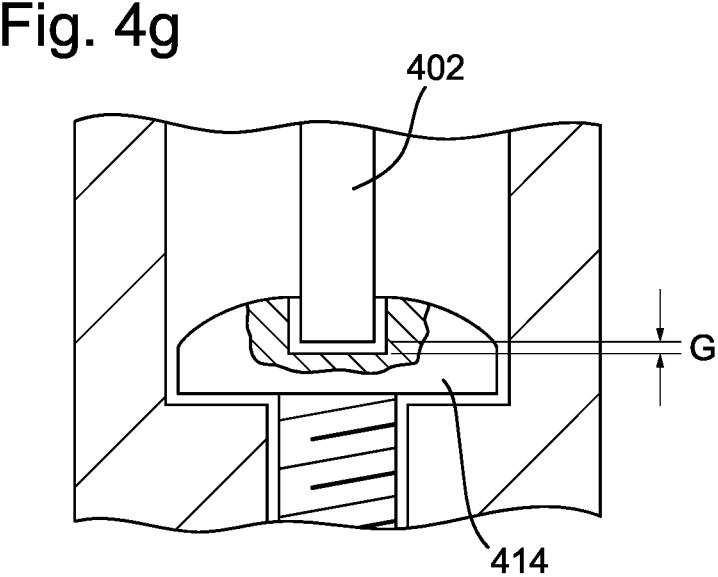
FIG. 4g is a cross sectional view of the tool tip of an embodiment engaged with the head of a screw in place in the jaws.

FIG. 4g is a close-up detail of the head 414 of the screw and the tool tip 402, where a gap, G, is defined between the end of the tool tip and the bottom of the screw head recess 415. This gap is maintained during the installation process and thus the only force applied to the screw is torque by the hexagonal faces of the tool tip engaging with the hexagonal faces of the recess. By maintaining the gap, there is no z-direction force applied. The gap between the tool tip and the screw is created initially by controlling the distance between the tool tip and a point on the screw gripper, which could be the end of the jaws, $P_J$.

Figure 5:
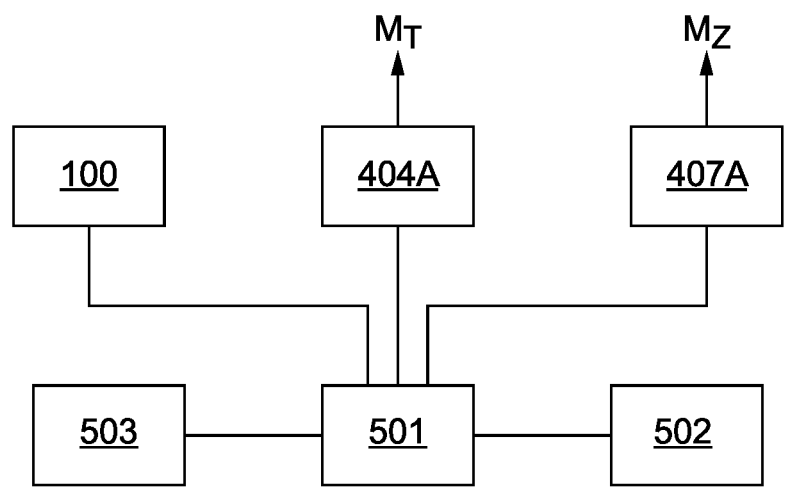
FIG. 5 is a schematic diagram showing the elements of the control system of an embodiment of the screwdriver attachment.

The arrangement of the screwdriver controller 301 is shown schematically in FIG. 5. A processor in the form of a programmable logic controller (PLC) 501 is in communication with a memory unit 502. The memory unit 502 includes a database for storing parameters characterising the screw type that is being installed and for storing information relating to the screw installation, including the absolute positions (x, y, z coordinates) of the holes into which the screws are to be installed and the speed at which the screw is to be installed and the torque to which the screw is to be tightened. Screw installation information can be entered manually or a teaching mode can be used, whereby the screwdriver is positioned manually and the coordinates and other parameters learned and stored so that the operating sequence can be for automated as described below.

The PLC 501 is arranged to execute a series of operations using the values stored in the database 502. The PLC 501 is arranged to transmit instructions to the tool motor amplifier 404A and to the z-direction motor 407A. It is also arranged to transmit instructions to the robotic arm controller 303

An interface 503 including a display and data entry means is attached to the PLC.

In use, an automated procedure, once programmed by the user would comprise the following steps:

1. Initiation

The user selects a screw type via the interface.

The PLC 501 then calculates the offset between the position of the end of the screw, $P_{ES}$, and the tool flange.

The PLC calculates the number of turns to provide to the z-direction motor per turn of the tool tip, as a function of the pitch of the screw.

The PLC then sends a signal to the z-direction motor amplifier to fully retract the tool tip and to load a screw from the feeder.

The PLC then sends a signal to the robotic arm to move the screwdriver attachment so that $P_{ES}$ is at the position of the first hole, $P_H$.

2. Installation

Figure 6A:
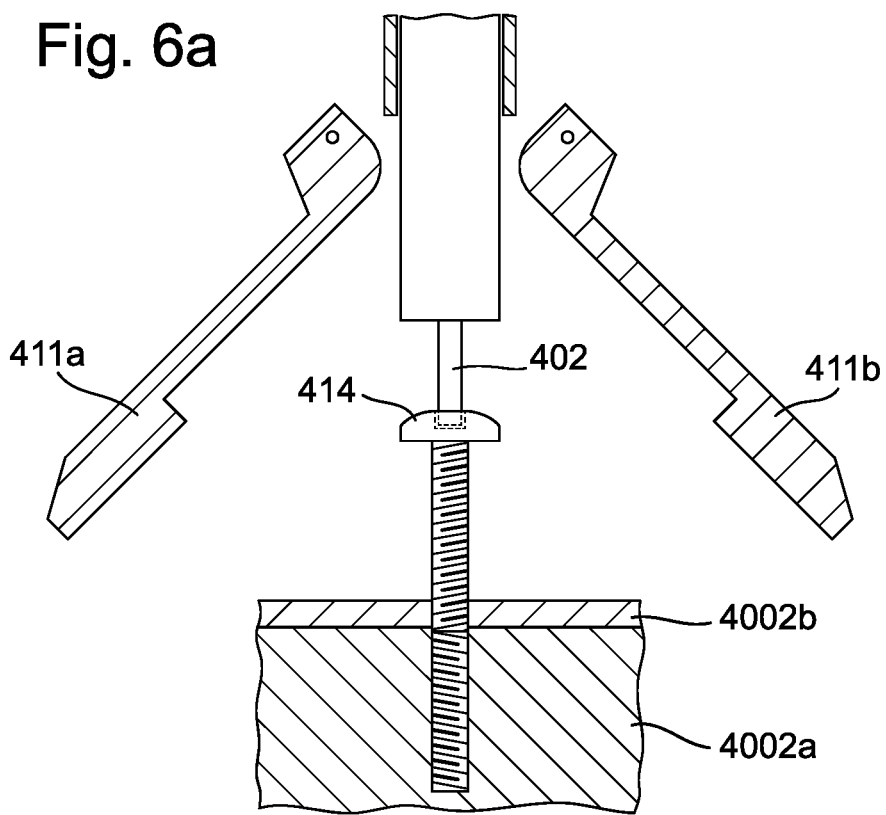
FIG. 6a is a cross sectional diagram showing the jaws of an embodiment in an open position and the tool tip engaged with the head of the screw just prior to installation of the screw.

When $P_{ES}=P_H$, the threads of the screw and the threads of the hole on the work-piece 4002a are aligned and ready to engage. The PLC 501 sends a control signal to operate the z-position motor until the tool tip 402 is engaged in the screw head recess 415 leaving a predefined gap of 0.1 mm between the end of the tool tip and the bottom of the recess in the screw head. The tool tip then presses down on the screw which opens the jaws, as shown in FIG. 6a, and the screw will remain in place, captured between the work-piece 4002b and the tool tip 402. The PLC then operates the tool motor and the tool tip engages with the head of the screw to turn it. As the screw turns, it moves downwards into the threaded hole of the component, by a distance equal to the pitch of the screw, $Pitch_S$, multiplied by the number of turns, $N_S$, applied to the screw. The PLC operates the z-direction motor to turn the lead screw by a corresponding number of turns, $N_{LS}$, to maintain the gap G between the tool tip and the bottom of the recess in the screw head, or if a force is required to be applied, to move the tool tip towards a position below the screw head. The number of turns, $N_{LS}$ applied to the lead screw by the z-direction motor as a function of the number of turns applied to the screw, $N_S$, is calculated by the PLC as follows:

For zero force to be applied in the z-direction throughout the screw installation process, the change in the z-coordinate of the position of the tool tip, $\Delta zP_T$, should be kept equal to the change in the z-coordinate of the bottom of the screw, $\Delta zP_R$:

$$\Delta zP_T = \Delta zP_R \quad (1)$$

The change in the z-coordinate of the bottom of the screw recess, $\Delta zP_R$, is a function of the screw pitch, $Pitch_S$, and the number of turns applied to the screw, $N_S$:

$$\Delta zP_R = Pitch_S \times N_S \quad (2)$$

The change in the z-coordinate of the tool tip 402, $\Delta zP_T$ is dependent on the lead screw pitch $Pitch_{LS}$ and the number of turns of the lead screw 407, $N_{LS}$, applied by the z-direction motor 408:

$$\Delta zP_T = Pitch_{LS} \times N_{LS} \quad (3)$$

Combining equations (2) and (3) into equation (1), the number turns that must be applied to the lead screw by the z-direction motor 408 as a function of the number of turns that are applied to the screw by the tool motor 404 is given as $$N_{LS} = N_S \times \frac{Pitch_S}{Pitch_{LS}} \quad (4)$$

The number of turns can be a whole number or a part of a whole number. For example, if the screw pitch is 0.5 mm and the lead screw pitch is 10 mm, the z-direction motor should move by 0.05 turns (or 6,550 pulses of the encoder for an encoder with 131,072 ppr resolution) for each turn of the tool-tip motor.

Figure 6B:
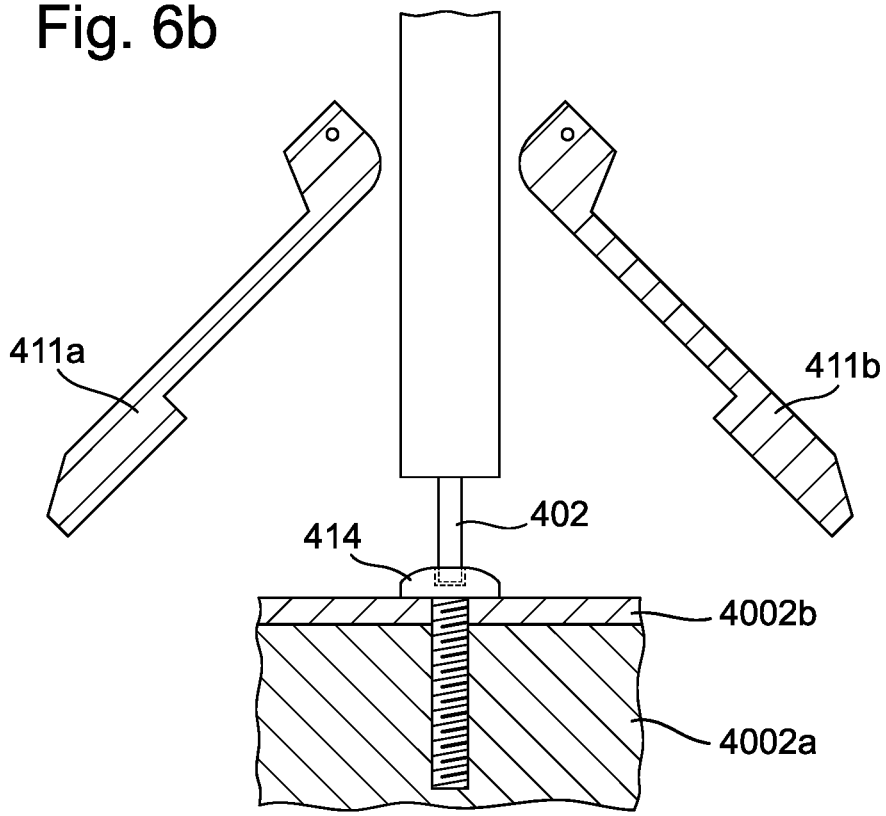
FIG. 6b is a cross sectional diagram showing the jaws open and the tool tip engaged with the head of the screw after installation of the screw.

For a screw of length 50 mm and pitch 0.5 mm, the screw should be turned 100 times by the tool motor to be fully installed. For a lead screw pitch of 10 mm, the z-direction motor should turn 5 times in the same time for the screw to be fully installed with zero force applied in the z-direction. A fully installed screw is shown in FIG. 6b. The processor controls the speed at which the screw is turned and the torque to which it is tightened. The use of high precision AC servomotors allows the screw to be installed quickly, with a high accuracy and with zero force in the z-direction.

An alternative approach to achieving the objective of controlling the z-direction motion of the tool tip so that it follows the screw as it is installed is described below.

The tool tip starts screwing in the screw, the z-direction motor needs to be operated so that the tool tip follows the screw as the screw is installed. The movement of the tool tip along the z-axis is effected by triggering a defined number of encoder steps at a given speed, calculated as follows:

The user-defined parameters for the screwing operation are:

Length of screw $L_S$.
Screw thread pitch $Pitch_S$.
Number of rotations R of the tool tip to fully install the screw (=$L_S \times Pitch_S$).
Tooltip screwing speed $S_S$.
Number of encoder steps in 360 degrees $E_{360}$.
Number of encoder steps to move 1 mm along the Z axis $Z_E$.

$Z_E = E_{360} \times Pitch_{LS}$, because pitch is the number of turns per mm, therefore the pitch of the Lead Screw, $Pitch_{LS}$, gives the number of turns of the Lead Screw, $N_{LS}$, required to move along the z-axis by 1 mm.

The time it takes to install the screw $T_S$ is given by:

$$T_S = L_S \times Pitch_S / S_S$$

The Length of the screw is converted to the number of encoder steps $Z_{ES}$ required to follow the screw in the z-direction as it is screwed in:

$$Z_{ES} = L_S \times Z_E$$

$$Z_{ES} = L_S \times E_{360} \times Pitch_{LS}$$

The speed required for the z-axis motor is then given by:

$$S_{LS} = Pitch_S \times S_S / Pitch_{LS}$$

This allows the tool tip to follow the screw, while maintaining a small gap between the tool tip and the screw recess and therefore apply zero pressure to the screw.

It is also possible to apply a controlled amount of force to the screw by moving the tool tip to a position slightly lower than the bottom of the recess in the screw. The distance that the tool tip is set to below the position of the screw will define the amount of force applied to the screw. By adjusting the starting point of the tool tip to a bit lower in relation to the screw, which initially is defined relative to the position of the jaws of the screw gripper, $P_J$, force during tightening will be applied to the fastener in the z-direction. The could be required for example if there is a spring washer placed between the screw and the component, and a small amount of force is required to compress the washer. Force can also be applied to correct for defects in the components being fixed together.

The screwing can be carried out in stages. The first stage involves slow rotation of the tool tip, around 500 RPM, as the screw catches the thread in the component. The second stage is the main rotation stage which can be much faster for screwing in the majority of the thread, at around 5,000 RPM. The third stage is again slower, at around 500 RPM as the screw is tightened to the required torque, which requires slower motion so that the torque can be measured.

3. Repetition

The PLC instructs the z-direction motor to retract the tool tip entirely, the jaws spring closed and a new screw to be loaded into place in the jaws. At the same time, the PLC instructs the robot arm to move the screwdriver attachment to the next position in the sequence. The process is then repeated. Fast and accurate control over the z-position of the tool tip allows for zero force in the z-direction, but also for the time between each screw installation to be minimised because a new screw can be loaded and put in place while the robotic arm is moving.

The screw may have a recess in its head that is cross-shaped or a flat channel and the tool tip would have a corresponding shape.

Figure 7:
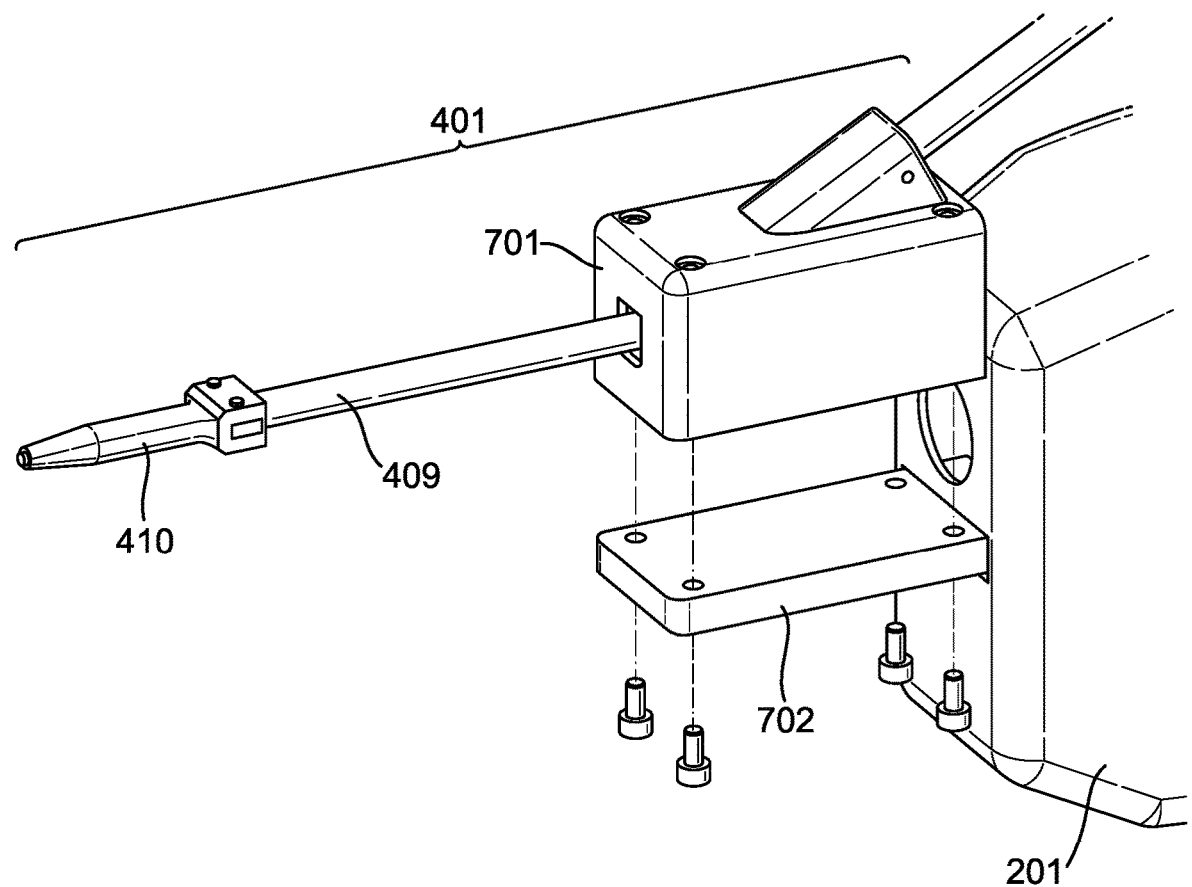
FIG. 7 shows how the tool can be changed.

Different sized screws can be accommodated by simply changing the tool 401, as shown in FIG. 7. The tool 401 includes the screw housing 409, the jaw assembly 410 and the screw feed input 701. The tool 401 attaches to the screwdriver housing 201 by a protruding tab 702.

The invention claimed is:

1. Screwdriver apparatus for a robotic arm, the apparatus being suitable for installing screws of a known pitch into a component, the apparatus comprising;
    a screw driving tool having a shaft rotatable about a central axis, the shaft having a distal end with a tip suitable for engaging with a screw, the shaft further having a proximal end connected to both a tool rotation apparatus and a tool linear movement apparatus,
    wherein the tool rotation apparatus is arranged to rotate the tool about the central axis and the tool linear movement apparatus is arranged to move the tool along the central axis,
    the screwdriver attachment characterised in that the tool rotation apparatus and the tool linear movement apparatus are arranged to cooperate such that the tool tip is maintained at a constant pre-defined distance in relation to the screw when in use; wherein the pre-defined defined distance is capable of being set such that there is a gap between the tool tip and the screw so that, in use, zero force is applied along the central axis as the screw is installed.

2. The screwdriver apparatus of claim 1, wherein the pre-defined distance is capable of being set such that, in use, the tool tip presses against the screw.

3. The screwdriver apparatus of claim 1, wherein the tool rotation apparatus comprises a tool rotation motor connected to the tool and a tool rotation motor controller for controlling the tool rotation motor.

4. The screwdriver apparatus of claim 1, wherein the tool linear movement apparatus comprises a tool linear movement motor and a tool linear movement motor controller for controlling the tool linear movement motor.

5. The screwdriver apparatus of claim 4, wherein the tool linear movement motor is connected to a lead screw that is parallel to the central axis, the lead screw having a known pitch, wherein the tool is linked to a nut mounted on the lead screw, such that rotation of the lead screw causes the tool to move along the central axis.

6. The screwdriver apparatus of claim 1, including a memory unit, the memory unit arranged to store user definable parameters relating to the screw type being installed, including the screw pitch, and parameters relating to the tool linear movement apparatus including the pitch of the lead screw, screwing speed and torque.

7. The screwdriver apparatus of claim 6, wherein motors of the tool rotation apparatus and tool linear movement apparatus are servo motors having encoders, and wherein the memory unit is further arranged to store data relating to the number of encoder steps in a full turn of the lead screw and the number of encoder steps required to move the tool a known distance along the central axis.

8. The screwdriver apparatus of claim 6, wherein the memory unit is arranged to store a user defined screwing speed at which the screw is installed and wherein a processor is arranged to control tool linear movement motor speed based on the screwing speed and the ratio of the screw pitch to the lead screw pitch.

9. The screwdriver apparatus of claim 1, including a processor arranged to send tool rotation signals to a tool rotation motor controller to rotate the tool and to send tool linear movement signals to a tool linear movement motor controller, wherein the processor is arranged to calculate the tool linear movement signals based on the tool rotation signals and the ratio of the screw pitch to the lead screw pitch.

10. The screwdriver apparatus of claim 1, including a screw housing tube for receiving a screw from a screw feeder apparatus, a screw gripper at the end of the housing tube for gripping a screw, and wherein the housing tube and screw gripper are removable and can be replaced with a different sized arrangement to allow different sized screws to be installed.

11. A robotic screwdriver system comprising a screwdriver attachment as claimed in claim 1, wherein the screwdriver attachment is controlled by a screwdriver controller, the system further comprising a robotic arm and a robotic arm controller, wherein the robotic arm controller includes a user interface for a user to input instructions to control the system.

12. A method of operating a screwdriver apparatus as claimed in claim 1, the method comprising the steps of:
controlling a tool rotation motor to rotate a screw,
controlling a tool linear movement motor to maintain the tool at a predetermined distance from the screw as the screw is rotated to control the force applied to the screw as it is installed; wherein the pre-defined distance is capable of being set such that there is a gap between the tool tip and the screw so that, in use, zero force is applied along the central axis as the screw is installed.

* * * * *